United States Patent [19]

Weymann et al.

[11] 3,929,703
[45] Dec. 30, 1975

[54] ADHESIVE COMPOSITIONS CONTAINING ZINC RESINATES OF DISPROPORTIONATED ROSIN

[75] Inventors: Henry P. Weymann, Acadia Parish, La.; John Korose, Gulf Breeze, Fla.

[73] Assignee: Reichhold Chemicals, Inc., White Plains, N.Y.

[22] Filed: May 16, 1974

[21] Appl. No.: 470,462

Related U.S. Application Data

[60] Continuation of Ser. No. 280,340, Aug. 14, 1972, which is a division of Ser. No. 154,590, June 18, 1971, abandoned.

[52] U.S. Cl. ....... 260/27 BB; 260/27 EV; 260/27 R; 260/97.5; 260/99.5; 260/105; 281/21
[51] Int. Cl.² ......................................... C08K 93/00
[58] Field of Search ..... 260/27 BB, 97.5, 105, 99.5, 260/27 EV; 281/21

[56] References Cited
UNITED STATES PATENTS

| | | | |
|---|---|---|---|
| 2,562,020 | 7/1951 | Darlington | 260/105 |
| 2,572,071 | 10/1951 | St. Clair | 260/97.5 |
| 3,615,106 | 10/1971 | Flanagan | 260/27 EV |
| 3,681,268 | 8/1972 | Bunk | 260/27 BB |

*Primary Examiner*—M. J. Welsh
*Assistant Examiner*—William E. Parker

[57] ABSTRACT

Slightly basic zinc resinates of disproportionated rosin are used as ingredients of pressure-sensitive adhesives and hot-melt adhesives.

10 Claims, No Drawings

ADHESIVE COMPOSITIONS CONTAINING ZINC RESINATES OF DISPROPORTIONATED ROSIN

This is a continuation of our application Ser. No. 280,340, filed Aug. 14, 1972, which is a division of our copending application Ser. No. 154,590, which was filed on June 18, 1971 now abandoned.

This invention relates to adhesive compositions. More particularly it relates to adhesive compositions that comprise a polymeric material and a slightly basic zinc resinate of disproportionated rosin.

In the past zinc resinates have found little use in the manufacture of adhesives because of their very limited compatibility with the polymeric materials upon which the adhesive compositions are based. For example, zinc resinates that are the reaction products of rosin and a stoichiometric excess of zinc oxide and hydrated lime have been used in small quantities in pressure sensitive adhesives where they serve primarily as a source of solubilized zinc metal when this metal is needed as a catalyst for a curing or heat-advancing resin.

In accordance with this invention, it has been found that slightly basic zinc resinates of disproportionated rosin have a high degree of compatibility with natural rubber, with synthetic rubbers, such as polychloroprene, butadiene-acrylonitrile polymers, and block copolymers of styrene, with polyolefins, and wiht blends of ethylene-vinyl acetate copolymers with wax. Because of their compatibility with polymeric materials and their other properties, these slightly basic zinc resinates of disproportionated rosin are useful as ingredients of a wide variety of adhesives including pressure-sensitive adhesives and hot-melt adhesives.

The zinc resinates of this invention are prepared by heating disproportionated rosin with a stoichiometric excess of zinc oxide and optionally a minor amount of another metal oxide until a product having a negative acid number is formed. To prepare the zinc resinates, disproportionated rosin that has a Ball and Ring Softening Point in the range of about 30°C. to 75°C. is heated at a temperature in the range of about 50°C. to 100°C. with from 10 percent to 17 percent and preferably 12 percent to 15 percent of its weight of zinc oxide and 0 to 4 percent and preferably zero to 2 percent of its weight of another metal oxide, for example, hydrated lime or magnesium oxide. The heating is continued until the reaction product is slightly basic, that is, until it has a calculated acid number in the range of zero to −70 and preferably in the range of −10 to −60. The reaction can be carried out in the absence of a solvent or in the presence of a solvent such as mineral spirits, toluene, xylene, or methyl ethyl ketone. It is preferably carried out in the presence of about 20 percent to 80 percent, based on the weight of the disproportionated rosin, of a solvent such as mineral spirits or xylene. After the completion of the reaction, the reaction mixture is heated to a temperature between about 150°C. and 250°C. to remove the solvent. It may then be sparged with stem to remove the last traces of solvent and volatile reaction by-products from the resinate.

The slightly basic zinc resinates that are prepared in this way are clear bright resins that are soluble in a wide variety of aromatic and aliphatic solvents and that have a high degree of compatibility with polymeric materials.

The disproportionated rosin from which the zinc resinates are formed may be prepared by known procedures from wood rosin, gum rosin, or tall oil rosin. For example, rosin can be disproportionated by heating it at a temperature between 50°C. and 300°C. in the presence of a catalyst, such as palladium, platinum, nickel, iodine, sulfur, or sulfur dioxide. A preferred method for the disproportionation of rosin, which yields a soft, tacky product, is described by Kajanne and Honkanen in their paper "Studies on Tall Oil Rosin", Parts I and II, Papieri ja Puu 39, No. 4a, 171–177, and No. 8, 377–382 (1957) (Finnish Paper Journal in English). In this process rosin is heated at 250°C. in the presence of 0.1 percent to 0.5 percent of iodine for from 0 to 10 hours. Soft disproportionated rosin prepared in this way has a Ball and Ring Softening Point between about 35°C. and 60°C. and an acid number in the range of 145 to 180.

The softening point of the zinc resinate is directly related to that of the disproportionated rosin from which it is prepared. The lower melting disproportionated rosins yield products that melt at temperatures below about 115°C., while the higher melting disproportionated rosins yield products that melt at 135°C. or higher.

When the disproportionated rosin that is used in the preparation of the zinc resinate has a softening point below about 55°C., it can be reacted with zinc oxide to form resinates that are readily recoverable from the reaction solution. The use of disproportionated rosin having a softening point above 60°C. makes it necessary to add about 1.0 percent to 2.0 percent of hydrated lime or another metal oxide as a coreactant with the zinc oxide to prevent "soaping", which is the formation of insoluble and infusible metal salts in the reaction mixture. When the disproportionated rosin has a softening point between about 55°C. and 60°C., it is frequently, but not always, possible to obtain useful resinates when zinc oxide is the only metal oxide that is present in the reaction mixture.

The zinc resinates of this invention can be used in the production of a variety of adhesive compositions that are based on polymers that are elastomers or thermoplastic resins. Such compositions may contain about 25 percent to 400 percent, based on the weight of the polymer, of the zinc resinate. These compositions include pressure-sensitive adhesives and hot-melt adhesives. The pressure-sensitive adhesives generally comprise a natural or synthetic elastomer and 25 percent to 100 percent, based on the weight of the elastomer, of a slightly basic zinc resinate of disproportionated rosin. The hot-melt adhesive compositions generally comprise 10 percent to 50 percent and preferably 20 percent to 30 percent by weight of a polyolefin resin such as polyethylene and ethylene-vinyl acetate copolymers; 20 percent to 50 percent and preferably 30 percent to 40 percent by weight of paraffin, a microcrystalline wax having a melting point in the range of 75°C. to 90°C., or a mixture of these waxes; and 30 percent to 60 percent and preferably 40 percent to 50 percent by weight of a slightly basic zinc resinate of disproportionated rosin.

The adhesive compositions may be prepared by conventional techniques. The hot-melt adhesive compositions may be prepared by blending the ingredients together at a temperature sufficient to melt them. The pressure-sensitive adhesive compositions may be prepared by mixing the ingredients together, for example, by milling on a rubber mill or by dissolving the ingredients in a solvent, such as toluene or mineral spirits.

In addition to the polymeric material and the zinc resinate, the adhesive compositions of this invention may contain dyes, fillers, pigments, antioxidants, antistatic agents, waxes, other polymeric materials, solvents, and the like in the amounts ordinarily employed for these purposes.

The invention is further illustrated by the following examples. In these examples all parts are parts by weight and all percentages are percentages by weight.

EXAMPLE 1

A mixture of 100 parts of disproportionated rosin that had a Ball and Ring Softening Point (ASTM Test Procedure E-28) of 56°C. and an acid number of 165, 14.5 parts of zinc oxide, and 70 parts of mineral spirits was heated at 50°C. until its calculated acid number was −35. The reaction mixture was heated to 250°C. to remove the mineral spirits; it was then sparged with steam at that temperature to remove traces of mineral spirits and volatile reaction by-products.

The zinc resinate obtained had a Ball and Ring Softening Point of 93°C., a Gardner color (50 percent solids in mineral spirits) of 7, and a Gardner-Holdt viscosity (50 percent solids in mineral spirits) of A-1. It was soluble in mineral spirits, toluene, xylene, methyl ethyl ketone and other organic solvents and compatible with natural rubber, ethylene-vinly acetate copolymers containing 18 percent to 40 percent of vinyl acetate, polychloroprene, polyethylene, butadiene-acrylonitrile polymers, and other polymeric materials.

EXAMPLE 2

A mixture of 100 parts of disproportionated rosin that had a Ball and Ring Softening Point of 56°C. and an acid number of 165, 13.2 parts of zinc oxide, 1.3 parts of hydrated lime, and 70 parts of mineral spirits was heated at 50°C. until its calculated acid number was −37. The reaction mixture was heated to 250°C. to remove the mineral spirits; it was then sparged with steam at that temperature to remove traces of mineral spirits and volatile reaction by-products.

The zinc resinate obtained had a Ball and Ring Softening Point of 99°C., a Gardner color (50 percent solids in mineral spirits) of 10-11, and a Gardner-Holdt viscosity (50 percent solids in mineral spirits) of A3-A4. It was soluble in mineral spirits, toluene, xylene, methyl ethyl ketone, and other organic solvents and compatible with a number of polymeric materials including natural rubber, ethylene-vinyl acetate copolymers containing 18 percent to 40 percent of vinyl acetate, polychloroprene, polyethylene, and butadiene-acrylonitrile polymers.

EXAMPLE 3

Pressure-sensitive adhesive were prepared from milled natural rubber and the products of Examples 1 and 2. Rubber from the same milling operation was used in all of the tests to insure that differences in adhesive properties could be attributed to the resinate component. The adhesives were evaluated by dissolving rubber and the resinate in toluene, coating the resulting viscous solution on 100 gauge Mylar polyester film, drying the adhesive coating, and then measuring the adhesion values in accordance with Pressure Sensitive Tape Council Test PSTC-1 and tack values by a modification of PSTC Test-18. The pressure sensitive adhesives that were evaluated and the data obtained are set forth in Table I.

In these tests comparative examples were included to show the properties of adhesives that contained in place of the zinc resinate of this invention either a commercially available polyterpene tackifying agent (Nirez 1115) (Comparative Example A) or a commercially available zinc resinate of unmodified rosin (Zirex) that has a combined zinc content of 8.86 percent and that is used in the production of some pressure-sensitive adhesives as a source of solubilized zinc (Comparative Example B).

Table I

| Example No. | 3A | 3B | Comp. Ex. A | Comp. Ex. B |
| --- | --- | --- | --- | --- |
| Resin Used | Product of Ex.1 | Product of Ex.2 | Nirez 1115 | Zirex |
| PEEL ADHESION (ounces per inch width) | | | | |
| Amount of Resin in Adhesive (Parts per 100 parts of rubber) | | | | |
| 25 | 2 | 5 | 1 | 9 |
| 50 | 8 | 13 | 9 | 18 |
| 70 | 13 | 23 | 17 | 30 |
| 80 | 18 | 24 | 19 | 36 |
| 90 | 22 | 32 | 30 | 30 |
| TACK (Arbitrary units) | | | | |
| 25 | 18 | 14 | 20 | 25 |
| 50 | 33 | 8 | 23 | 9 |
| 70 | 26 | 4 | 18 | 0 |
| 80 | 19 | 4 | 9 | 0 |
| 90 | 15 | 0 | 2 | 0 |

From the data in Table I, it will be seen that the product of Example 1 imparts a high degree of pressure sensitive tack to natural rubber as well as an acceptable degree of adhesion. The product of Example 2 imparts an excellent degree of pressure-sensitive adhesion and less tack to natural rubber. Adhesives that contain the products of this invention have a better combination of pressure-sensitive characteristics than do those that contain the comparative resins.

EXAMPLE 4

A series of hot-melt adhesives was prepared by forming a mixture of an ethylene-vinyl acetate copolymer, paraffin, and either a basic zinc resinate or a resin that is used commercially in the production of hot-melt adhesives and heating the mixture until a homogeneous melt was obtained. The ingredients used in the preparation of the adhesives and the properties of the adhesives are set forth in Table II. 8n

TABLE II

|  | Ex. 4 | Comp. Ex. C | Comp. Ex. D | Comp. Ex. E |
| --- | --- | --- | --- | --- |
| Formulation (parts by weight) | | | | |
| Ethylene-vinyl acetate copolymer (Elvax 265) | 20 | 20 | 20 | 20 |
| Paraffin (AMP-155°) | 35 | 35 | 35 | 35 |
| Product of Ex. 1 | 45 | — | — | — |
| Polyterpene resin (MP-115°C.) | — | 45 | — | — |
| Polyterpene resin (MP-125°C.) | — | — | 45 | — |
| Polyterpene resin (MP-135°C.) | — | — | — | 45 |
| Dilauryl thiodipropionate | 0.2 | 0.2 | 0.2 | 0.2 |

TABLE II-continued

|  | Ex. 4 | Comp. Ex. C | Comp. Ex. D | Comp. Ex. E |
| --- | --- | --- | --- | --- |
| Properties of Fresh Adhesive |  |  |  |  |
| Viscosity* cps., 380°F. | 1600 | 900 | 960 | 980 |
| 320°F. | 3000 | 1160 | 1850 | 1900 |
| Melting Point (Fischer-John) (°F.) | 160 | 148 | 148 | 150 |
| Needle Penetration at 72°F. | 5 | 6 | 9 | 8 |
| Tensile Strength (psi) | 770 | 905 | 670 | 830 |
| Elongation (%) | 215 | 115 | 75 | 150 |
| Toughness Index** | 1.7 | 1.0 | 0.4 | 1.2 |
| Color (Gardner) of molten adhesive | 12 | 6 | 6 | 5 |
| Properties of Adhesive After Ageing in an Open Metal Container in Circulating Air Oven at 350°F. for 100 Hrs. |  |  |  |  |
| Viscosity,* cps., 380°F. | 2600 | 1450 | 1850 | 1500 |
| 320°F. | 11,000 | 4000 | 4300 | 4000 |
| Melting Point (Fisher-John) (°F.) | 180 | 164 | 158 | 153 |
| Needle Penetration at 72°F. | 4 | 8 | 7 | 7 |
| Tensile Strength (psi) | 700 | 800 | 575 | 730 |
| Elongation (%) | 565 | 300 | 90 | 265 |
| Toughness Index** | 4.0 | 2.4 | 0.5 | 1.9 |
| Color (Gardner) of molten adhesive | 17 | 14 | 15 | 14 |
| Charring | None | None | None | None |
| Insolubles settling | None | None | None | None |
| Appearance | Clear | Clear | Clear | Clear |
| Surface Skin | None | None | None | None |

*Viscosity was determined by plotting viscosity vs. temperature on semi-log paper at 5° intervals for at least 25°F. as the hot melt slowly cools and then extrapolating the data to the two standard temperatures, 320°F. and 380°F. A Brookfield Viscometer, Model LV, was used for the measurements.
**Toughness Index is the product of tensile strength (psi) and elongation (%) divided by $10^5$ for convenience. It has been found valuable as a single parameter to compare formulations.

From these data it will be seen that the hot-melt adhesive that contained the product of Example 1 was superior in many ways to the comparative adhesives that contained polyterpene resins.

What is claimed is:

1. An adhesive composition that comprises a polymeric material selected from the group consisting of natural rubber, polyethylene, ethylene-vinyl acetate copolymers, polychloroprene, butadiene-acrylonitrile polymers, block polymers of styrene with butadiene, block polymers of styrene with isoprene, and mixtures thereof and 25 percent to 400 percent, based on the weight of said polymeric material, of a zinc resinate of disproportionated rosin, said resinate being the product prepared by (a) forming a mixture that consists of 100 parts by weight of disproportionated rosin that has a Ball and Ring Softening Point in the range of about 40°C. to 75°C., 10 to 17 parts by weight of zinc oxide, and 0 to 4 parts by weight of hydrated lime and (b) heating said mixture at a temperature in the range of about 50°C. to 100°C. to form a resinate having a calculated acid number in the range of 0 to −70.

2. A pressure-sensitive adhesive composition as defined in claim 1 that comprises natural rubber and 25 percent to 100 percent, based on the weight of the rubber, of said zinc resinate.

3. A pressure-sensitive adhesive composition as defined in claim 2 wherein the zinc resinate has a calculated acid number in the range of −10 to −60.

4. A hot-melt adhesive composition as defined in claim 1 that comprises (a) 10 percent to 50 percent by weight of a polyolefin resin selected from the group consisting of polyethylene and ethylene-vinyl acetate copolymers; (b) 20 percent to 50 percent by weight of a wax selected from the group consisting of paraffin, microcrystalline wax, and mixtures thereof; and (c) 30 percent to 60 percent by weight of said zinc resinate.

5. A hot-melt adhesive composition as defined in claim 4 that comprises (a) 20 percent to 30 percent by weight of a polyolefin resin selected from the group consisting of polyethylene and ethylene-vinyl acetate copolymers; (b) 30 percent to 40 percent by weight of a wax selected from the group consisting of paraffin, microcrystalline wax, and mixtures thereof; and (c) 40 percent to 50 percent by weight of said zinc resinate.

6. A hot-melt adhesive composition as defined in claim 4 wherein the zinc resinate has a calculated acid number in the range of −10 to −60.

7. A hot-melt adhesive composition as defined in claim 4 wherein the polyolefin resin is an ethylene-vinyl acetate copolymer.

8. A hot-melt adhesive composition as defined in claim 4 wherein the polyolefin resin is polyethylene.

9. A hot-melt adhesive composition as defined in claim 4 wherein the wax is paraffin.

10. A hot-melt adhesive compositions as defined in claim 4 wherein the wax is microcrystalline wax having a melting point in the range of 75°C. to 90°C.

* * * * *